United States Patent
Mattfeld

(10) Patent No.: US 11,279,096 B2
(45) Date of Patent: Mar. 22, 2022

(54) WELDING METHOD

(71) Applicant: TPU PLUS GMBH, Aachen (DE)

(72) Inventor: Patrick Mattfeld, Aachen (DE)

(73) Assignee: TPU Plus GmbH, Aachen (DE)

( * ) Notice: Subject to any disclaimer, the term of this patent is extended or adjusted under 35 U.S.C. 154(b) by 199 days.

(21) Appl. No.: 16/580,500

(22) Filed: Sep. 24, 2019

(65) Prior Publication Data

US 2020/0079033 A1     Mar. 12, 2020

Related U.S. Application Data

(63) Continuation of application No. PCT/EP2018/000138, filed on Mar. 29, 2018.

(51) Int. Cl.
    *B29C 65/00*     (2006.01)
    *B29C 65/02*     (2006.01)
    (Continued)

(52) U.S. Cl.
    CPC .......... *B29C 66/3452* (2013.01); *B29C 65/02* (2013.01); *B29C 66/004* (2013.01);
    (Continued)

(58) Field of Classification Search
    CPC ... B29C 66/3452; B29C 65/02; B29C 66/004; B29C 66/1122; B29C 66/30621; B29C 66/52211; B29C 66/612; B29C 66/71; B29C 66/73921; B29C 65/04; B29C 66/7352; B29C 66/712; B29C 66/8322; B29C 66/306; B29C 66/5221;
    (Continued)

(56) References Cited

U.S. PATENT DOCUMENTS 2,623,571 A    12/1952   Webber
6,056,526 A *   5/2000   Sato ........................ B29C 43/18
                                                 156/245
(Continued)

FOREIGN PATENT DOCUMENTS

FR           2207812 A1     6/1974
WO     WO9706954 A1     2/1997

OTHER PUBLICATIONS

Lay Flat Hoses, irrigationbox.cn, Dec. 2016, https://www.irrigationbox.cn/layflat-hoses-nitrile-rubber-polyurethane-pvc. (Year: 2016).*

*Primary Examiner* — Michael N Orlando
*Assistant Examiner* — Christopher W Raimund
(74) *Attorney, Agent, or Firm* — Von Rohrscheidt Patents

(57) ABSTRACT

A method for welding a first hose end at a joint with a second hose end in a seam that extends on a circumference of the first hose end, the method comprising the steps: applying a protective layer at the joint to an inside of the first hose end; pushing the second hose end beyond the joint over the first hose end; pressing the first hose end and the second hose end together flat at the joint between two first damping jaws that are moved towards each other; welding the first hose end and the second hose end together by two first partial seams while pressed together, wherein the protective layer prevents a welding of the inside of the first hose end; releasing the first hose end and the second hose end from the two first clamping jaws after welding the two first partial seams.

9 Claims, 1 Drawing Sheet

(51) Int. Cl.
*B29K 675/00* (2006.01)
*B29L 30/00* (2006.01)

(52) U.S. Cl.
CPC .... *B29C 66/1122* (2013.01); *B29C 66/30621* (2013.01); *B29C 66/52211* (2013.01); *B29C 66/612* (2013.01); *B29C 66/71* (2013.01); *B29C 66/73921* (2013.01); *B29C 66/81267* (2013.01); *B29K 2675/00* (2013.01); *B29L 2030/00* (2013.01)

(58) Field of Classification Search
CPC . B29C 66/3062; B29C 65/16; B29C 65/4895; B29C 66/81267; B29C 65/1403; B29K 2675/00; B29L 2030/00; B29L 2023/245; B29L 2023/005; F16L 47/02; F16L 31/00
See application file for complete search history.

(56) References Cited

U.S. PATENT DOCUMENTS

| | | | |
|---|---|---|---|
| 6,090,233 A | 7/2000 | Delmer | |
| 6,540,859 B1 | 4/2003 | Alvidrez | |
| 6,632,306 B1 | 10/2003 | Roberts | |
| 2003/0202719 A1* | 10/2003 | Wilkes | B29C 66/8221 383/120 |
| 2005/0211373 A1* | 9/2005 | Tomasetti | A61M 39/146 156/304.5 |
| 2014/0230985 A1* | 8/2014 | Merino Lopez | B60C 5/04 152/503 |

* cited by examiner

WELDING METHOD

RELATED APPLICATIONS

This application is a continuation of International application PCT/EP2018/000138 filed on Mar. 29, 2018 claiming priority from German patent application DE 10 2017 106 906.2 filed on Mar. 30, 2017, both of which are incorporated in their entirety by this reference.

FIELD OF THE INVENTION

The invention relates to a method for welding a first hose end at a joint with a second hose end.

BACKGROUND FO THE INVENTION

U.S. Pat. No. 6,540,859 B1 discloses a method of this generic type for splicing a watering hose. So called "cat eyes" form at both ends of the cross section of the hose during compression of the hose. The hose is deflected by 180° in a small portion of its circumference, wherein the outside is stretched and the inside is compressed. During opening of the hose the inside is stretched accordingly. A weld introduced at this location is thus weakened.

U.S. Pat. No. 6,090,233 A proposes to insert a protective layer configured as a flat heat shield made from starch, wax paper, fiber glass, cotton, wool, asbestos or Teflon® into an interior of a hose end of a watering hose in order to weld two hose ends. Welding the hose ends with the known method causes leakage at both lateral edges of the heat shield.

U.S. Pat. No. 2,623,571 introduces a method for producing an inner air tube for a vehicle wheel, wherein both ends are beveled cone and funnel shaped accordingly and welded together.

BRIEF SUMMARY OF THE INVENTION

It is an object of the invention to improve the tightness of the weld.

Improving upon the known method it is proposed according to the invention a method is proposed for welding a first hose end at a joint with a second hose end in a seam that extends on a circumference of the first hose end, the method including the steps: applying a protective layer at the joint to an inside of the first hose end; pushing the second hose end beyond the joint over the first hose end; pressing the first hose end and the second hose end together fiat at the joint between two first clamping jaws that are moved towards each other; welding the first hose end and the second hose end together by two first partial seams while pressed together, wherein the protective layer prevents a welding of the inside of the first hose end; releasing the first hose end and the second hose end from the two first clamping jaws after welding the two first partial seams; pressing the first hose end and the second hose end together again flat transversal to the first partial seams by two second clamping jaws; and welding the first hose end and the second hose end in two second partial seams wherein the first partial seams and the second partial seams form the seam.

The two step welding prevents the weakening at the "cat eyes", Leak tightness is thus increased further in particular for larger wall thicknesses of the hose ends.

Advantageously the first partials seams and the additional partial seams cover different portions of the circumference according to this method. Simultaneously with the welding a lettering or another marking can be applied to the second hose end. The size of the marking is limited to the size of the clamping jaws, thus to the size of the respective partial seam. The asymmetrical welding in two steps with different length partial seams facilitates a larger marking on the hose end due to the longer partial seam.

Advantageously the first partial seams and the second partial seams overlap. Thus gaps between the first and the second partial seams are avoided. Further advantageously the first and the second partial seams cover up to 120% of the circumference in combination.

Advantageously the longer clamping jaws and thus the longer partial seams cover at least 60% of the circumference. Further advantageously the longer clamping jaws do not cover more than 80% of the circumference in order to prevent an excessive mechanical load and thus damages to the extruded material in the "cat eyes".

The protective layer can be limited to half of a circumference according to the method according to the invention. In order to prevent a welding of the inside the position of the protective layer along the circumference has to be considered when inserting the protective layer between the clamping jaws.

Advantageously the first hose end and/or the second hose end is made from a thermoplastic polyurethane material in a method according to the invention. Thermoplastic polyurethane (TPU) is particularly suited for extrusion. The method according to the invention can also be used in particular also to weld a TPU hose without burr with a hose made from another thermoplastic material.

Advantageously the hose ends are thermally welded in a method according to the invention. Thermal welding methods, thus methods where the surfaces to be welded are heated far enough so that they flow together and form a bonded unit are performed particular by high frequency, by laser or by electron beam. Alternatively the hose ends can also be welded chemically in particular by temporarily partially dissolving the surfaces to be welded.

Advantageously the clamping jaws are transparent in a method according to the invention. Transparent clamping jaws are permeable for a laser or electron beam.

Advantageously the protective layer is applied to the inside by a roller in a method according to the invention. Alternatively the protective layer can be applied to the inside using a different method, e.g. sprayed on. Further advantageously the protective layer can be loosely applied to the inside.

Advantageously the protective layer cures before welding according to the method according to the invention. Alternatively the protective layer can be made from a material that is already hard during application.

Advantageously the protective layer is made from a lacquer that is temperature resistant up to at least 250° C. after curing in a method according to the invention. Temperature resistant lacquers based on polyester, PVC-mix, mix polymerisates, polyvinyl acetate, polyvinyl butyral, nitro cellulose, acetyl cellulose or cellulose acetate are well known. Alternatively the protective layer can be made from a temperature resistant foil, e.g. a metal foil, in particular aluminum which is applied to the inside before the welding.

The invention furthermore proposes a method for producing an inner tube for a vehicle wheel wherein a blank is cut from an endless hose shaped extruded material and closed into a torus shape and two hose ends of the blank are welded to form the inner tube as described supra. A generic method of this type for producing inner tubes is known in the art.

BRIEF DESCRIPTION OF THE DRAWINGS

The invention is subsequently described based on an embodiment with reference to drawing figures, wherein.

DETAILED DESCRIPTION OF THE INVENTION

Figure 1:
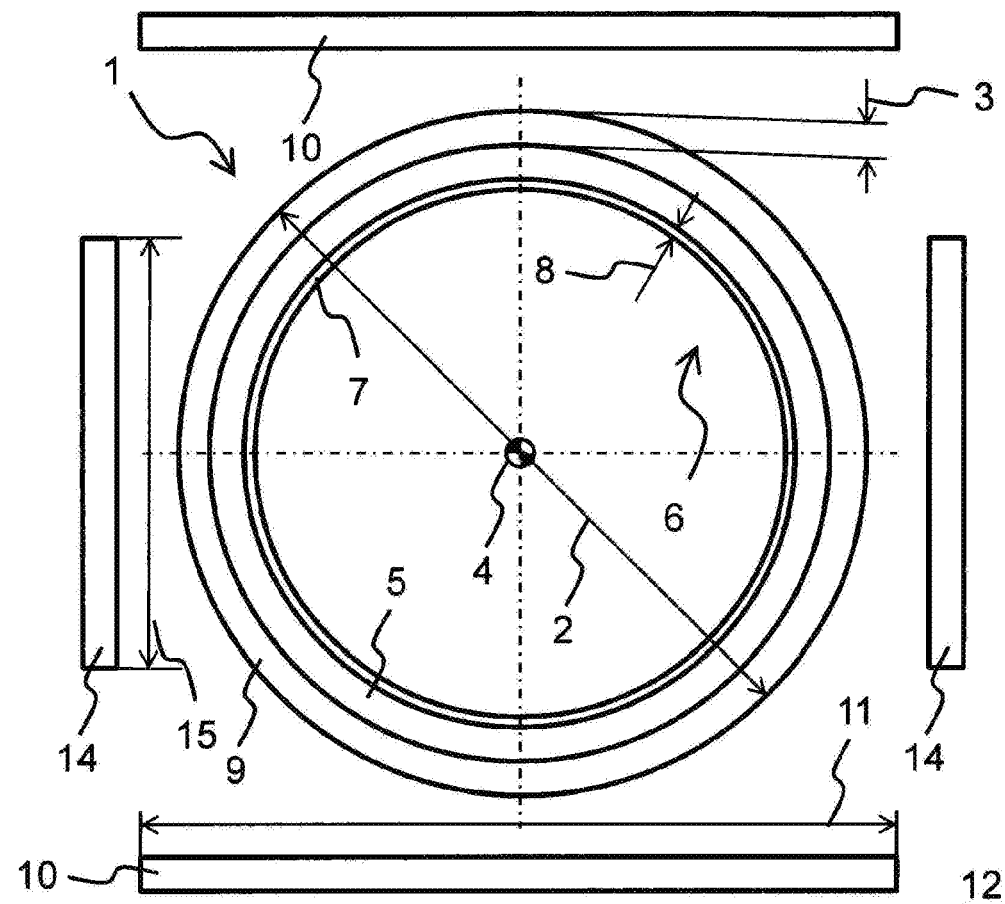
FIG. 1 illustrates a cut through an inner tube.

In a method according to the invention an inner tube 1 for a non-illustrated 29″ wheel of a bicycle is produced. The inner tube 1 is not illustrated to scale in FIG. 1 in a sectional view of the joint. The inner tube 1 has an outer diameter 2 of 30 mm. The wall thickness 3 of the inner tube 1 is 350 μm. The inner tube 1 is fabricated endless by blow foil extrusion from thermoplastic polyurethane (TPU) on a polyester base.

The extruded material is cut into non-illustrated blanks of 2030 mm respectively precisely orthogonal to the longitudinal hose axis 4.

A first hose end 5 of the blank is opened so that the inside 6 becomes visible and easily accessible. A protective layer 7 made from a heat resistant clear lacquer (e.g. with the trade name MOTIP 04033) with a thickness of approximately 5 μm is applied to the inside 6 circumferentially to a depth of 20 mm in a direction of the longitudinal hose axis 4 using a small felt roller.

The protective layer 7 wets an entire circumference of the inside 6. Thus locally limited welds are avoided which would degrade a quality of the weld seam and would even lead to not being able to separate the two inner foils from each other.

After a drying time of approximately 30 minutes during which the protective layer 7 cures the first hose end 5 is inserted into the second hose end 9 so that the two overlap by approximately 10 mm. The protective layer 7 is temperature resistant up to 800° C.

Figure 2:
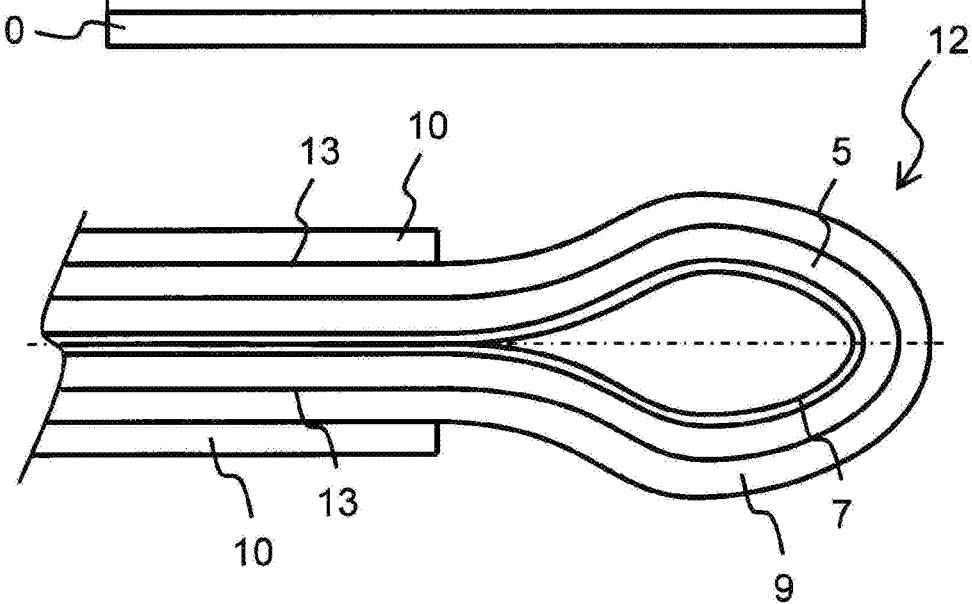
FIG. 2 illustrates a detail of the method according to the invention.

The first hose end 5 and the second hose end 9 are pressed together flat as illustrated in FIG. 2 and are initially welded together by high frequency between two first clamping jaws 10 with a length 11 of approximately 33 mm which corresponds to approximately 70% of the hose width. Simultaneously the first clamping jaws 10 emboss and print the logo of the manufacturer and technical specifications and test seals of the inner tube 1 onto the joint.

Then the inner tube 1 is erected in the portion of the cat eyes 12, pressed together again flat transversal to the first partial seams 13 and welded together again between two second clamping jaws 14 over a length 15 of approximately 19 mm which corresponds to approximately 40% of the hose width. The electrodes are made from brass and have a non-illustrated width of 5 mm in a direction of the hose longitudinal axis 4. The clamping jaws 10, 14 and thus the first partial seams 13 and the second partial seams cover 110% of the circumference in combination.

REFERENCE NUMERALS AND DESIGNATIONS

1 inner tube
2 outer diameter
3 wall thickness
4 longitudinal hose axis
5 first hose end
6 inside
7 protective layer
8 thickness
9 second hose end
10 first clamping jaw
11 length
12 cat eye
13 first partial seam
14 second clamping jaw
15 length

What is claimed is:

1. A method for welding a first hose end at a hose joint with a second hose end in a closed seam that extends on a circumference of the first hose end, the method comprising the steps:

applying a protective layer at the joint to an inside of the first hose end;

pushing the second hose end beyond the joint over the first hose end;

pressing the first hose end and the second hose end together flat at the joint between two first clamping jaws that are moved towards each other;

welding the first hose end and the second hose end together by the first partial seams while pressed together flat to form a partially welded hose joint, wherein the protective layer prevents a welding of the inside of the first hose end;

releasing the first hose end and the second hose end from the two first clamping jaws after welding the two first partial seams and erecting the partially welded hose joint from being pressed flat;

pressing the first hose end and the second hose end at the partially welded hose joint together again flat transversely to the first partial seams by two second clamping jaws; and welding the first hose end and the second hose end in two second partial seams while pressed together flat transversely to the first partial seams so that the first partial seams and the second partial seams form the closed seam at a completely circumferentially welded hose joint.

2. The method according to claim 1, wherein the first partial seams and the second partial seams cover different portions of the circumference.

3. The method according to claim 1, wherein the first hose end or the second hose ends are made from thermoplastic polyurethane.

4. The method according to claim 1, wherein the first hose end and the second hose end are thermally welded.

5. The method according to claim 1, wherein the first clamping jaws and the second clamping jaws are transparent.

6. The method according to claim 1, wherein the protective layer is applied by a roller to the inside of the first hose end.

7. The method according to claim 1, wherein the protective layer cures before the welding.

8. The method according to claim 7, wherein the protective layer is made from a lacquer that is heat resistant up to at least 250° C. after curing.

9. A method for producing an inner tube for a vehicle wheel, the method comprising the steps:

cutting a blank from an endless hose shaped extruded material; and closing the blank into torus shape before welding the first hose end and the second hose end of the blank together according to the method of claim 1 to form the inner tube.

* * * * *